United States Patent
Ananthakrishnan

(10) Patent No.: US 6,701,147 B1
(45) Date of Patent: Mar. 2, 2004

(54) METHOD AND SYSTEM FOR HANDLING A CALL FROM A MOBILE STATION WITHIN A WIRELESS COMMUNICATION NETWORK

(75) Inventor: Kalpathi Ananthakrishnan, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 491 days.

(21) Appl. No.: 09/699,532

(22) Filed: Oct. 30, 2000

(51) Int. Cl.[7] .............................. H04Q 7/20; H04Q 7/38
(52) U.S. Cl. ................. 455/433; 455/422.1; 455/426.1; 455/426.2; 455/445; 455/403; 379/221.08; 379/221.09; 379/221.1; 379/220.01
(58) Field of Search ................................ 155/433, 422, 155/403, 406, 407, 408, 426, 550, 517, 435, 445, 405, 500, 422.1, 426.1, 426.2, 432.1, 432.2, 432.3, 435.1, 550.1; 379/221.08, 221.09, 221.1, 221.14, 220.01

(56) References Cited

U.S. PATENT DOCUMENTS 6,002,936 A * 12/1999 Roel-Ng et al. ............ 455/433
6,434,126 B1 * 8/2002 Park .......................... 455/433
6,496,570 B1 * 12/2002 Nimphius .................... 455/422
6,545,987 B1 * 4/2003 Becher ..................... 455/422.1
2002/0176379 A1 * 11/2002 Wallenius et al. .......... 455/435

* cited by examiner

Primary Examiner—William Trost
Assistant Examiner—Keith Ferguson
(74) Attorney, Agent, or Firm—Randall W. Mishler; Bracewell & Patterson, L.L.P.

(57) ABSTRACT

An improved method and system for handling a call from a mobile station within a wireless communication network is disclosed. The mobile telephone communication network includes a mobile switching center (MSC) and a service control point (SCP). After a call has been initiated from a first mobile station to a second mobile station, the MSC sends an initialDP message to the SCP. The initialDP message preferably includes a classmark field. In response to the call from the first mobile station to the second mobile station, the MSC sets up the call to the second mobile station. The MSC then notifies the SCP that the call to the second mobile station has been initiated. Finally, the MSC receives a request from the SCP to inform the SCP when the call being answered by the second mobile station.

6 Claims, 2 Drawing Sheets

METHOD AND SYSTEM FOR HANDLING A CALL FROM A MOBILE STATION WITHIN A WIRELESS COMMUNICATION NETWORK

BACKGROUND OF THE INVENTION

1. Technical Field

The present invention relates to a method and system for servicing a wireless communication network in general, and in particular to a method and system for servicing a mobile telephone communication network. Still more particularly, the present invention relates to a method and system for handling a call from a mobile station within a mobile telephone communication network.

2. Description of the Prior Art

Today, wireless telecommunications represents a large and continuously increasing percentage of all new telephone subscriptions around the world. The specifications for a Global System for Mobile Communication (GSM) digital mobile cellular radio system was formulated by a standardization group known as European Telecommunications Standards Institute (ETSI) established in 1982.

A typical cellular mobile telecommunication system includes multiple geographic regions known as cells. Each cell contains at least one base transceiver station (BTS). A BTS communicates directly with a mobile station (or mobile telephone) located in a corresponding cell. Several cells are grouped within a location area that contains one or more mobile switching centers (MSCs), and each of the MSCs is typically connected to several BTSs within the location area. The primary function of an is to execute the switching requirements necessary to properly route calls between a mobile station located in one cell and a mobile station located in another cell. In addition, an MSC may be connected to a public switching telephone network (PSTN) such that the MSC can also facilitate the routing of calls between a mobile station and a fixed telephone terminal connected to the PSTN.

A home location register (HLR) can be associated with one or more MSCs. An HLR, which is essentially a database, maintains a user record for each of a number of mobile stations associated with a corresponding service area, and these mobile stations are said to be assigned to the HLR. Each record within an HLR contains, among other things, an identification code for the corresponding mobile station, information regarding the type of service associated with that mobile station, and information defining the current location of the mobile station. Another component that is used in providing a mobile station with the capability to transmit and receive calls while roaming is a visiting location register (VLR). A VLR, which is also a database, is typically associated with a corresponding MSC. Unlike an HLR, a VLR maintains a user record for each visiting mobile station. When a mobile station roams into a location area, a record identifying that mobile station will be established in a VLR. When the mobile station leaves the location area, the record identifying that mobile station is deleted from the VLR.

In addition to basic cellular service, many cellular mobile telecommunication systems also provide intelligent network (IN) services. IN services may include, for example, the ability to place originating IN calls such as placing a call to a fixed telephone terminal by dialing only a four digit extension rather than the entire seven or ten digit telephone number. Those skilled the art will recognize that such IN service is often referred to as a private numbering plan. A component known as a service control point (SCP) is typically required to provide IN services. More particularly, the SCP maintains the service logic and instructs the corresponding MSC to perform action, such as playing tones and announcement, in order to provide the service to a mobile subscriber.

The disadvantage of the current SCP implementation is that the SCP is not aware of the capabilities of the mobile station with which a mobile subscriber uses to answer an incoming call, and transmissions of error messages from the MSC to the SCP are required to be invoked as a result. Specifically, when a mobile subscriber answers an incoming call with a mobile station, an associated SCP may send a message to a corresponding MSC directing the MSC to provide certain functionality. Upon receiving the message from the SCP, the MSC may then realize that the mobile station does not have the capability to support the requested functionality. At this point, the MSC sends an error message back to the SCP, indicating that the requested functionality cannot be provided. The error message typically includes a cause parameter for indicating the cause of failure. In this case, the cause of failure would be the lack of capability of the mobile station to provide the requested functionality originated by the SCP.

For example, according to the GSM IN standard, there is a function called Send Charging Information (SCI). An SCP can invoke this function by sending an SCI message to an MSC when the MSC has indicated to the SCP that a subscriber with intelligent network services has originated a call. The SCI message contains parameters, which when sent to the mobile station, to indicate to a mobile subscriber the current credit balance available. The SCI message can also indicate the running cost of the call that the mobile subscriber is currently on. However, this function can only be provided by mobile station that has Phase 2 capabilities. Thus, when the MSC receives an SCI message from the SCP, the MSC needs to determine whether or not a receiving mobile station has the Phase 2 capabilities. If the receiving mobile station does have Phase 2 capabilities, the call proceeds as normal and the parameters will be sent to the receiving mobile station. Otherwise, if the mobile station does not have phase 2 capabilities, the MSC will then send an error message back to the SCP with a cause parameter indicating the cause of failure.

The present disclosure provides an improvement to the current SCP implementation such that transmissions of error messages from the MSC to the SCP can be reduced.

SUMMARY OF THE INVENTION

In accordance with a preferred embodiment of the present invention, a mobile telephone communication network includes a mobile switching center (MSC) and a service control point (SCP). After a call has been initiated from a first mobile station to a second mobile station, the MSC sends an initialDP message to the SCP. The initialDP message preferably includes a classmark field. In response to the call from the first mobile station to the second mobile station, the MSC sets up the call to the second mobile station. The MSC then notifies the SCP that the call to the second mobile station has been initiated. Finally, the MSC receives a request from the SCP to inform the SCP when the call being answered by the second mobile station.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
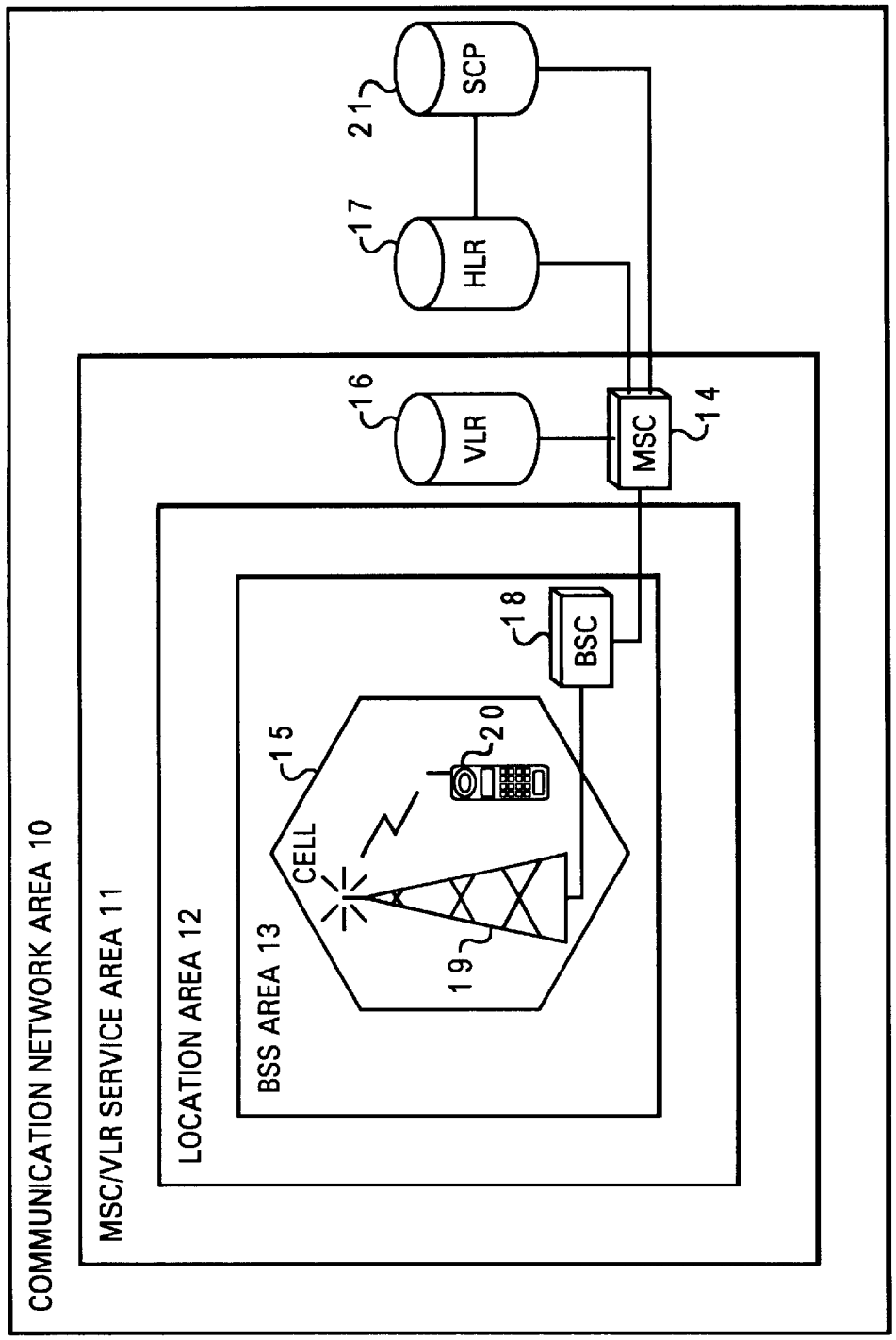
FIG. 1 is a pictorial diagram of a mobile telephone communication network in which a preferred embodiment of the present invention is implemented.

The present invention is applicable in all digital protocol-based mobile telephone communications systems having a non-transparent data link. Referring now to the drawings and in particular to FIG. 1, there is depicted a pictorial diagram of a mobile telephone communication network 10 in which a preferred embodiment of the present invention may be implemented. As shown, mobile telephone communication network 10, which is preferably a Global System for Mobile Communication (GSM) Public Land Mobile Network (PLMN), includes at least one mobile switching center/visitor location register (MSC/VLR) service area, such as a MSC/VLR service area 11. MSC/VLR service area 11 includes at least one MSC, such as a MSC 14, and one VLR, such as a VLR 16. MSC/VLR service area 11 also includes at least one location area (LA), such as an LA 12. LA 12 is defined as that part of a given MSC/VLR service area 11 in which a mobile station (MS) 20 may move freely without having to send update location information to MSC/VLR service area 11. LA 12 is divided into a number of cells, such as cell 15. MS 20 is the physical equipment, e.g., a car telephone or other mobile telephone handset, used by a mobile subscriber to communicate with another mobile subscriber within mobile telephone communication network 10, and with users outside the subscribed network, both wireline and wireless.

MSC 14 is in communication with at least one base station controller (BSC) 18, which, in turn, is in contact with at least one Base Transceiver Station (BTS), such as a BTS 19. BTS 19 is the physical equipment, illustrated for simplicity as a radio tower, that provides radio coverage to cell 15 for which it is responsible. It should be understood that BSC 18 may be connected to several BTSs 19, and BSC 18 may be implemented as a stand-alone node or integrated with MSC 14. In either case, BSC 18 and BTS 19, as a whole, are generally referred to as a base station system (BSS) located within a BSS area 13.

MSC 14 is coupled to VLR 16 and a home location register (HLR) 17. HLR 17 is a database maintaining all subscriber information, e.g., user profiles, current location information, International Mobile Subscriber Identity (IMSI) numbers, and other administrative information. HLR 17 may be co-located with a given MSC or integrated within a MSC. HLR 17 can also service multiple MSCs. VLR 16 is a database containing information about MS 20 currently located within MSC/VLR area 11. If MS 20 roams into a new MSC/VLR area, a VLR connected to an MSC within the new MSC/VLR area will request data about MS 20 from HLR 17 (simultaneously informing HLR 17 about the current location of MS 20). Accordingly, if the user of MS 20 then wants to make a call, VLR 16 will have the requisite identification information without having to reinterrogate HLR 17. Thus, VLR 16 and HLR 17, respectively, contain various subscriber information associated with MS 20.

MSC 14 is also coupled to a service control point (SCP) 21. SCP provides intelligent network (IN) services for mobile telephone communication network 10. Specifically, SCP 21 maintains all service logic needed by MSC 14 to properly service a call originated from or terminated to an IN subscriber assigned to HLR 17.

Whenever a mobile station, such as MS 20, that has already been subscribed to an intelligent network service originates a call, MSC 14 may send an InitialDP message to SCP 21. In response to the InitialDP message from MSC 14, SCP 21 then transmits a message called Send Charging Information (SCI) back to MSC 14. The SCI message, which includes e-parms, is then sent to MS 20 from MSC 14 via a facility message.

Figure 2:
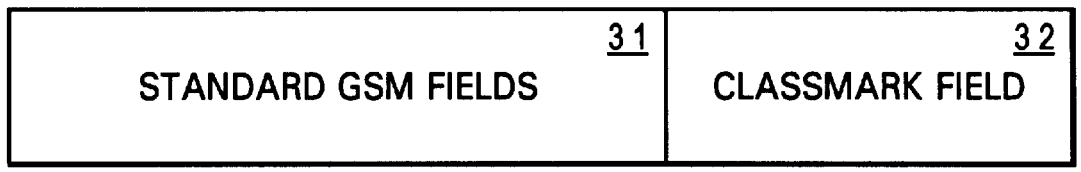
FIG. 2 is a block diagram of an improved InitialDP message in accordance with a preferred embodiment of the present invention.

With reference now to FIG. 2, there is illustrated a block diagram of an InitialDP message in accordance with a preferred embodiment of the present invention. As shown, an InitialDP message 30 includes multiple standard GSM fields 31 and a classmark field 32. Examples of standard GSM fields 31 are as follows:

ServiceKey

This parameter unambiguously identifies the requested IN service for the gsmSCF. This parameter is used to address the correct application/Service Logic Program (SLP) within the gsmSCF (not for gsmSCF addressing). This parameter is mandatory in InitDPs for all scenarios.

CalledPartyNumber

This parameter contains the number used to identify the called party in a forward direction.

CallingPartyNumber

This parameter carries the calling party number to identify the calling party or the origin of the call. The calling party number represents the party who is to be billed for that leg of the call.

CallingPartysCategory

This parameter indicates the type of calling party (e.g., operator, pay phone, ordinary subscriber).

LocationNumber

This parameter conveys the geographical area address for mobility services. This parameter is used when "CallingPartyNumber" does not contain any information about the geographical location of the calling party (e.g. origin dependent routing when the calling party is a mobile subscriber).

OriginalCalledPartyID

This parameter carries the dialed digits if the call has met call forwarding enroute the DMS/MSC SSP.

HighLayerCompatibility

This parameter indicates the type of the high layer compatibility that is used to determine the ISDNteleservice of a connected ISDN terminal.

AdditionalCallingPartyNumber (AcgPN)

This optional parameter is the additional calling party number provided by the access signaling system of the calling user. This parameter is encoded in the ISUP generic number parameter, with address type set to additional calling part number.

BearerCapability

This parameter contains the value of the ISUP user service information parameter. The parameter shall only be included in the InitialDP operation in case the ISUP User Service Information parameter is available at the gsmSSF. If User service Information and User Service information Prime are available at the gsmSSF, the "bearerCap" shall contain the value of the User Service Information Prime parameter.

EventTypeBCSM
This parameter indicates the armed BCSM DP event, resulting in the InitialDP operation.

RedirectingPartyID
This parameter indicates the directory number the call was redirected from.

RedirectionInformation
This parameter contains forwarding related information, such as redirecting counter, redirection reason, etc.

CalledPartyBCDNumber
This parameter contains the number used to identify the called party in the forward direction. This parameter may also include service selection information, including * and # digits. This parameter is included for Mobile Origination traffic only.

BasicServiceCode
This parameter indicates the type of basic service, i.e. bearer service or teleservice.

IMSI
This parameter is the IMSI of the mobile subscriber for which the CAMEL service is invoked.

LocationInformation
This parameter indicates the location of a triggering mobile subscriber, possibly including the following Information Elements (IE's):

Location Number-This IE is based on the ISUP address parameter, i.e. address information and address digits. As a parameter of location information (for a mobile subscriber) the format of the address digits is: Country Code (CC)+National Destination Code (NSC)+Directory Number (DN).

CellidOrLai—This IE consists of the following information: Mobile country code (MCC)+Mobile Network Code (MNC)+Location Area Code (LAC)+Cel Identifier (CellID, if available). If the CellID is not available this parm will contain MCC+MNC+LAC.

Age of location information—indicates how old the information is in minutes.

VLR Number—This Ie is populated from the office parameter GSMVLR_NUMBER in table OFCVAR.

Geographic Information—This is populated from SRI_ACK operation that is received upon triggering DP 12.

SubscriberState
The state of the terminating mobile subscriber for whom the CAMEL service is being invoked. This parameter is populated if returned in the SRI_ACK. The possible states are:
  CAMELbusy
  NetworkDeterminedNotReachable
  AssumeIDle, and
  NotProvidedFromVLR CallReferenceNumber
The call reference parameter identifies the call for which billing correlation should be provided.

MSCAddress
This parameter gives the mscID assigned to the GMSC/MSC. This parameter is encoded in the E.164 format. This IE is populated from office parameter GSMMSC_NUMBER in table OFCVAR.

TimeAndTimezone
This parameter contains the time that the gsmSSf was triggered and the time zone that the invoking gsmSSF resides in. The time and time zone are relative to GMT (Greewich Mean Time).

Gsm-ForwardingPending
This parameter indicates that a forwarded to number (FTN) was received and the call will be forwarded due to GSM supplementary service call forwarding in the GMSC. It is a NULL parameter and is sent the gsmSCF when FTN is received.

The above-mentioned standard GSM fields are simply some examples of standard GSM fields within an InitialDP message. Details for the above-mentioned standard GSM fields can be found in GSM standard 9.78, the pertinent of which is incorporated herein by reference.

Classmark field 32 indicates the capability of a mobile station, such as MS 20 in FIG. 1, that initiates a call. Classmark field 32 preferably describes attributes of the mobile station, such as encryption capabilities, radio-frequency (RF) power level supported, short message capability, etc. Other classmark parameters can be found in the GSM standards.

Figure 3:
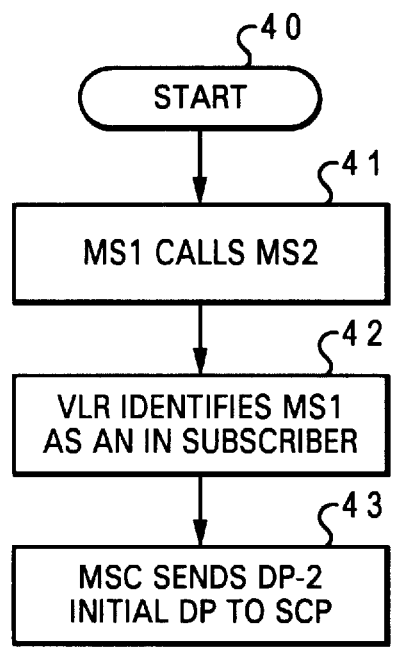
FIG. 3 is a high-level flow diagram of a method for handling calls using the improved InitialDP message from FIG. 2, in accordance with a preferred embodiment of the present invention.

Referring now to FIG. 3, there is illustrated a high-level flow diagram of a method for handling calls using the initialDP message from FIG. 2, in accordance with a preferred embodiment of the present invention. Starting at block 40, a first mobile subscriber originates a call via a first mobile station (MS1) to a second mobile subscriber at a second mobile station (MS2), as shown in block 41. Both the first mobile station and the second mobile station are preferably located within a communication network area that is served by a common MSC. A corresponding VLR within the communication network area identifies the first mobile subscriber as an IN subscriber, as depicted in block 42. The MSC then sends an initialDP message to an associated SCP, as illustrated in block 43, to notify the SCP that an incoming call from the first mobile station has been initiated. After decoding the classmark parameter within the initialDP message, the SCP would be fully aware of the capabilities of the first mobile station.

As has been described, the present invention provides an improvement to the current implementation of IN services such that the transmission of error messages from the MSC to the SCP can be reduced. This is accomplished by the transmission of an initialDP message having a classmark parameter whenever a mobile station initiates a call. Because the initialDP message includes a classmark parameter that indicates the capabilities of a mobile station, thus, the MSC can acquaint the SCP with the capability of the mobile station via the InitialDP message. With such knowledge, the SCP has the option of not making any request that the mobile station does not have the capability to provide. As a result, wasteful messaging, such as error messages, between the MSC and the SCP can be drastically reduced.

It is important to note that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:
1. A method for handling calls within a mobile telephone communication network, wherein said mobile telephone communication network includes a mobile switching center (MSC) and a service control point (SCP), said method comprising:

in response to a call from a first mobile station to a second mobile station, building an initialDP message having a classmark field, wherein said classmark field indicates capabilities of said first mobile station;

sending said initialDP message by said MSC to said SCP;

in response to said initialDP message from said MSC, said SCP continues a dialog with said MSC using standard protocol messages; and upon completion of said dialog, said MSC initiates said call to said second mobile station.

2. The method of claim 1, wherein said building further includes building an initialDP message by said MSC.

3. The method of claim 1, wherein said classmark field describes encryption capabilities, radio-frequency (RF) power level supported, and/or short message capability of said first mobile station.

4. A mobile telephone communication network having a mobile switching center (MSC) and a service control point (SCP), said mobile telephone communication network comprising:

means for building an initialDP message having a classmark field, wherein said classmark field indicates capabilities of said first mobile station, in response to a call from a first mobile station to a second mobile station;

means for sending said initialDP message from said MSC to said SCP;

means for continuing a dialog with said MSC using standard protocol messages, in response to said initialDP message from said MSC; and means for initiating said call to said second mobile station, upon completion of said dialog.

5. The mobile telephone communication network of claim 4, wherein said building means further includes building an initialDP message by said MSC.

6. The mobile telephone communication network of claim 4, wherein said classmark field describes encryption capabilities, radio-frequency (RF) power level supported, and/or short message capability of said second mobile station.

\* \* \* \* \*